April 26, 1966 S. SLEPICKA 3,248,068
POWER TAKE-OFF MOUNTED WIRE WINDER
Filed Sept. 19, 1963 2 Sheets-Sheet 1
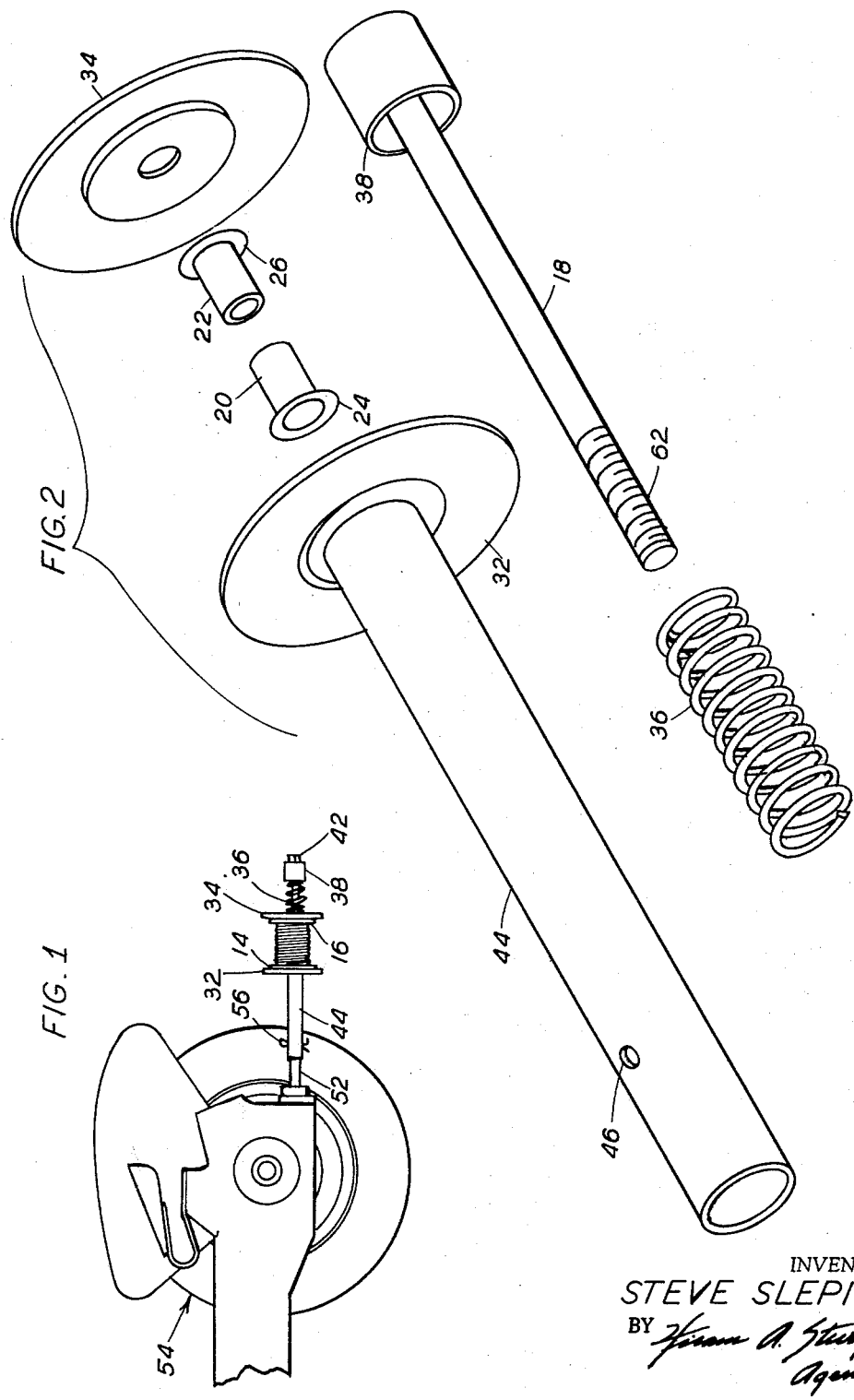
INVENTOR.
STEVE SLEPICKA April 26, 1966 S. SLEPICKA 3,248,068
POWER TAKE-OFF MOUNTED WIRE WINDER
Filed Sept. 19, 1963 2 Sheets-Sheet 2

INVENTOR.
STEVE SLEPICKA
BY Hiram A. Sturges,
Agent

United States Patent Office 3,248,068
Patented Apr. 26, 1966

3,248,068
POWER TAKE-OFF MOUNTED WIRE WINDER
Steve Slepicka, Wilber, Nebr.
Filed Sept. 19, 1963, Ser. No. 309,983
5 Claims. (Cl. 242—86.7)

The present invention relates to wire winding spools, reels, and the like, designed to be installed on power take-off shafts of tractors, and in particular a shaft extended through flanges at the ends of a spool with a spring extended around an extended end of the shaft, and with an adjusting nut threaded on the end of the shaft positioned in the power take-off shaft of a tractor.

The purpose of this invention is to provide a wire winder which is particularly useful for winding electrical fence wire and that is of more effective construction for permitting more rapid replacement of a wire spool thereon.

Various types of mountings have been provided for attaching wire winding spools, reels, and the like to rotatable elements of tractors and other machines. However, such devices require special tools and equipment, and in some instances, threaded shafts which damage clothing, project at the trailing ends. Furthermore, it is difficult to adjust the tension required to turn such spools without removing the entire attachment.

With these thoughts in mind this invention contemplates a wire winder including a spool having flanges at the ends with the flanges mounted by collars on a shaft, with the shaft adjustably mounted in the end of a power take-off shaft of a tractor, and with a spring positioned between the opposite end of the spool and a cap positioned on the opposite end of the shaft.

The object of this invention is, therefore, to provide a wire winder particularly adapted to receive wire spools formed of light gauge metal, since spools of wire are delivered from manufacturers on light gauge metal. A problem has heretofore existed in that repeated use of light gauge wire spools has caused them to be destroyed beyond effective usefulness.

It is therefore, an object of the invention to provide a wire winder which is adapted to give adequate support to a light gauge wire spool through the means of applying a rotary drive pressure to the ends of the spool winding areas through pressure plates.

Still another object is to provide collars for disposal in openings at the ends of a wire delivery spool for protecting the light gauge spool from abrasion while rotating about a threaded shaft, thus further making possible the extending of the threads of the shaft farther into the spool without excessive abrasion, whereby the additional length of threads makes possible reception on the shaft of spools of greater variation in width for providing greater versatility.

A further object is to provide smooth housing means for protecting clothing from a spring or threads at the outer end of the device to reduce the danger of clothing being caught therein.

A further object is to provide all of the above advantages in a wire winder of the type utilizing spring means for effecting a drive connection between a shaft and a spool whereby the spring means can be tensioned to disengage a spool from driven rotation responsive to the increase of forces acting on the spool tending to hold the spool against rotation above a predetermined value.

It is yet another object of the invention to provide a spool for winding fence wire, and the like, in which the spool is carried by a shaft threaded into the extended end of a power take-off shaft, such as of a tractor, and the tension of a spring on the shaft is adjusted by turning the shaft from the outer end thereof.

A still further object is to provide a wire winder, particularly designed for wrapping electric fence wire in which the winder is of simple and economical construction.

Other and further objects and advantages of the present invention will be apparent from the following detailed description, drawings and claims, the scope of the invention not being limited to the drawings themselves as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a longitudinal section through the rear portion of a tractor showing the wire winder of the present invention mounted on the power take-off shaft of the tractor.

FIGURE 2 is an exploded view showing, in perspective, the individual elements of the wire winder of the present invention, the parts being shown on an enlarged scale.

Figure 3:
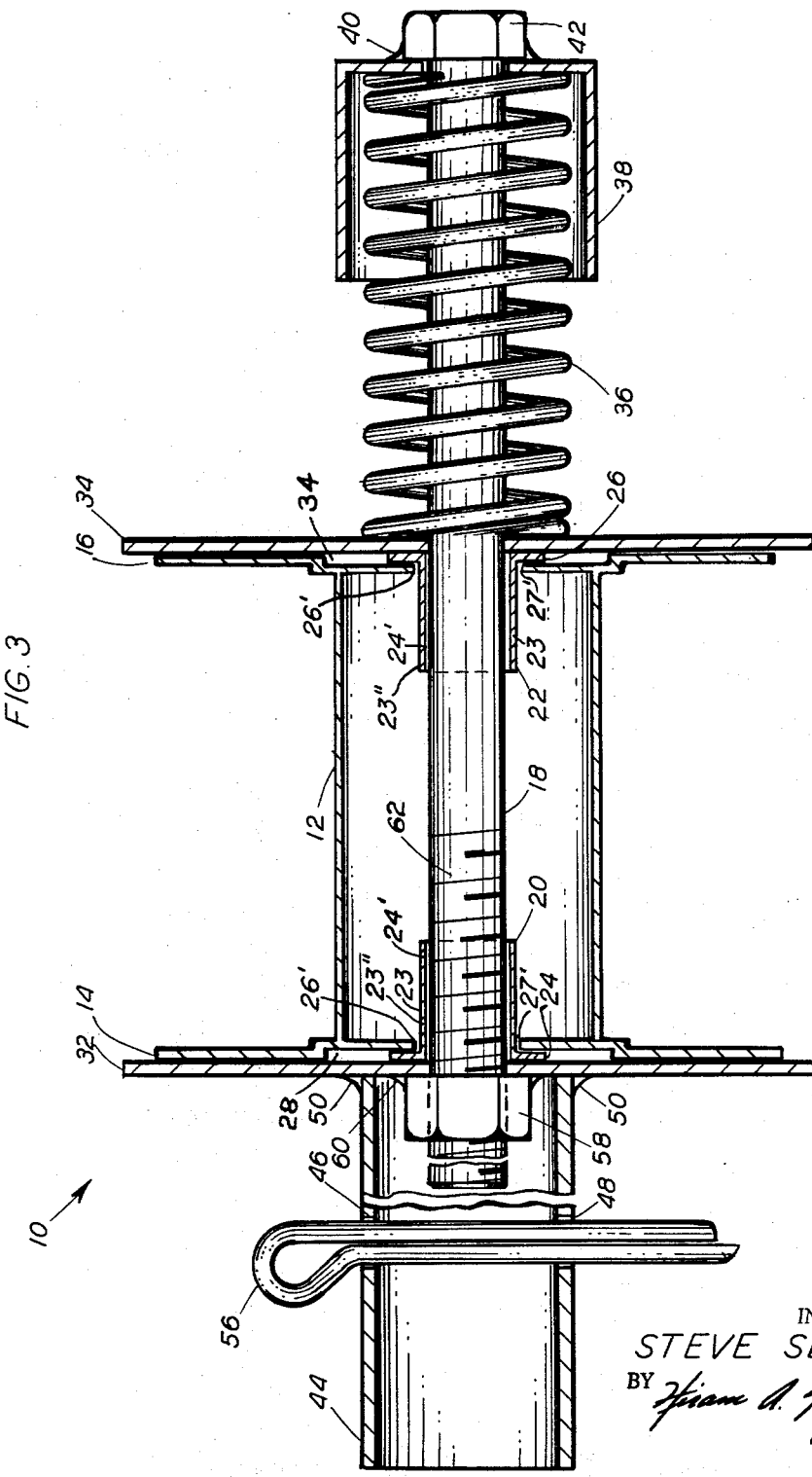
FIGURE 3 is a longitudinal section through the wire winder of this invention, also with the parts shown on an enlarged scale.

While one embodiment of the present invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a cylinder having flanges 14 and 16 at the ends, numeral 18 indicating a shaft extended through the flanges 14 and 16 and cylinder 12, numerals 20 and 22 indicating collars having flanges 24 and 26 on the outer ends, said flanges nesting in recesses 28 and 30 in outer surfaces of the flanges 14 and 16, numerals 32 and 34 indicating pressure plates positioned against outer surfaces of the flanges 14 and 16, and numeral 36 indicating a spring positioned on the outer end of the shaft 18, and arranged whereby the outer end thereof extends into a cap 38 on the shaft and secured, such as by welding 40 to the head 42 of the bolt forming the shaft.

A mounting sleeve 44 having aligned openings 46 and 48 therein is secured to the pressure plate 32, such as by welding, as shown at the points 50 and, as shown in FIGURES 1 and 3, the sleeve 44 extends over the power take-off shaft 52 of a tractor 54. The sleeve is secured to the take-off shaft by a suitable means such as a cotter pin 56 which extends through the openings 46 and 48. A nut 58, also secured to the pressure plate 32 by welding 60, is positioned to receive the threaded end 62 of the shaft 18, whereby the tension of the spring 36 is adjustable from the outside of the winder.

The collars 20 and 22 can also be called spaced annular spool receiving members having shaft receiving portions 23 provided with shaft receiving openings 24' receiving the shaft 18 therethrough. The spool receiving members 20 and 22 each have an approximately cylindrical spool supporting surface defined by their outer cylindrical surfaces 23" of the shaft receiving portions 23 disposed generally parallel to and co-axial with the shaft 18 for receiving thereagainst the wall 26' of an opening 27' through the spool 12, the opening 27' extending continuously through the spool 12 parallel to the shaft 18.

The wall 26' actually, in a more specific sense, has two parts, one disposed at the flange 14, and the other at the flange 16.

Each spool receiving member 20 and 22 also has a flange means or flange 24 or 26 respectively extending outwardly from the shaft 18 on that side of the respective spool supporting surface 23" which is disposed farthest from the opposite spool receiving member 20 or 22.

It will be seen that the shaft 18 is attached to the sleeve 44 by means of the pressure plate 32 and the threaded nut 58. It will be further seen that means is provided on the sleeve 44 for engaging that side of that certain spool receiving member 20 which is adjacent the sleeve 44 to limit movement of that certain spool receiving member 20 in a direction toward the sleeve 44 and that such means comprises the pressure plate 32 and its attachment to the sleeve 44, whereby, in a sense, the pressure plate 32 serves as a part of the means discussed in this sentence, and also a part of the means attaching the shaft 18 to the sleeve 44. Although, for purposes of clarification of this double means service, one could think of that part of the pressure plate 32 serving the purpose of interconnection between the shaft 18 and the sleeve 44, and the other part of the pressure plate 32 serving the purpose of a means for preventing the collar 20 from moving toward the sleeve 44.

With the parts assembled as illustrated and described the end of a wire, such as that of an electric fence wire, is secured in the spool, and, as the spool is rotated by the power take-off of a tractor wire is wrapped on the spool. The wire is removed from the spool in the same manner.

From the foregoing description it is thought to be obvious that a power take-off mounted wire winder constructed in accordance with this invention is particularly well adapted for use by reason of the convenience and facility with which it may be assembled and operated, and it will also be obvious that this invention is susceptible of some change and modifications without departing from the principles and spirit thereof, and for this reason it is not desired to limit the invention to the precise arrangement and formation of the several parts herein shown in carrying out the invention in practice, except as claimed.

What is claimed is:

1. A power take-off mounted wire winder comprising a cylinder having flanges with recesses therein on the ends thereof providing a reel, a pressure plate having a threaded opening therein, a shaft extended through the reel and threaded into said pressure plate, collars having flanges on the ends thereof positioned in the ends of the reel and rotatably mounted on said shaft, the flanges of the collars being positioned in the recesses of the flanges of the cylinder, a spring on the end of the shaft extended from the reel on the opposite end thereof from the pressure plate, a cap on the outer end of the shaft and positioned to receive the extended end of the spring, the threads of the shaft coacting with the threads of the pressure plate whereby upon rotation of the shaft tension of the spring is adjusted, and means for mounting the pressure plate on the power take-off shaft of a tractor.

2. A wire winder for attachment to a rotatable power take-off member of a tractor, comprising: a sleeve proportioned to receive said member, means to engage the sleeve with said power take-off member for rotation therewith, a shaft, means attaching said shaft to said sleeve in a manner for holding said shaft in a position extending axially outwardly from said sleeve, a pair of collars disposed on said shaft in slidable and rotatable relation thereto and adapted to be disposed in the ends of a wire receiving spool, respectively, to protect said spool from wear, each of said collars having a flange extending outwardly therefrom in a direction approximately diametrically outwardly from the axis of said shaft to prevent said collars from passing completely into the spool, each said flange being on that end of its collar which is disposed opposite to the other one of said collars whereby a wire winding spool having end flanges with circular holes therethrough disposed in alignment with the axis of said shaft can be received on said collars with said flanges disposed on the outer sides, respectively, of the ends of said spool, a pair of spaced annular pressure plates disposed on said shaft on opposite sides of said collars for receiving said spool therebetween, a compression spring disposed around said shaft on the opposite end thereof from said sleeve and disposed on the opposite side of said pressure plate from said sleeve, means attached to said shaft at that end thereof which is opposite said sleeve for causing said spring to exert a pressure on said pressure plate to force said pressure plates toward each other to exert a pressure on said spool, means on said sleeve for engaging that one of said pressure plates which is disposed closest to said sleeve for preventing said respective pressure plate from moving along said sleeve, said shaft having a threaded end adjacent said sleeve, said means for attaching said shaft to said sleeve comprising a threaded member adapted to receive said shaft, whereby said shaft can be threadedly removed therefrom for the separation and replacement of said pressure plates and collars from said shaft and spool.

3. The combination of claim 2, in which that end of said shaft which is opposite said sleeve is provided with a bolt head to facilitate the application thereto of a wrench for positioning said shaft.

4. The combination of claim 2, in which a housing is disposed around the outer side of at least a portion of the outer end of said spring, said housing having a generally smooth cylindrical exterior surface to protect a user's clothing from being caught in said spring.

5. A wire winder for attachment to a rotatable power take-off member of a tractor, comprising: a sleeve proportioned to receive said member means to engage the sleeve with said power take-off member for rotation therewith, a shaft, means attaching said shaft to said sleeve in a manner for holding said shaft in a position extending axially outwardly from said sleeve, spaced annular spool receiving members having shaft receiving portions provided with shaft receiving openings receiving said shaft therethrough, said spool receiving members each having an approximately cylindrical spool supporting surface generally parallel to and co-axial with said shaft for receiving thereagainst the wall of the opening of a spool, and each spool receiving member also having flange means extending outwardly from said shaft on that side of the respective spool supporting surface which is disposed farthest from the opposite spool receiving member, means on said sleeve engaging that side of that certain spool receiving member which is adjacent said sleeve to limit movement of said certain spool receiving member in a direction toward said sleeve, a compression spring disposed around said shaft on the opposite side of said spool receiving members from said sleeve, means attached to said shaft at that end thereof which is opposite said sleeve for causing said spring to exert a pressure on the adjacent spool receiving member for pressing said spool receiving members toward each other to compress a spool therebetween.

References Cited by the Examiner

UNITED STATES PATENTS

| | | | |
|---|---|---|---|
| 1,977,714 | 10/1934 | Beran | 242—118.4 |
| 2,059,242 | 11/1936 | Jung | 242—74.2 |
| 2,765,991 | 10/1956 | Frey et al. | 242—86.5 |
| 2,857,117 | 10/1958 | Hendrix | 242—86.5 |
| 3,098,624 | 7/1963 | De Forest | 242—86.7 |
| 3,128,962 | 4/1964 | Bieber | 242—86.5 |

FRANK J. COHEN, *Primary Examiner.*

JORDAN FRANKLIN, J. R. BOLER,
*Assistant Examiners.*